United States Patent [19]

Smith et al.

[11] Patent Number: 5,102,842
[45] Date of Patent: Apr. 7, 1992

[54] CATALYST FOR THE POLYMERIZATION OF ALPHA-OLEFINS CONTAINING TRIFLUOROPROPYL SUBSTITUTED SILANE COMPOUNDS

[75] Inventors: Crystal A. Smith, Boothwyn, Pa.; Constantine A. Stewart, Wilmington, Del.

[73] Assignee: Himont Incorporated, Wilmington, Del.

[21] Appl. No.: 572,525

[22] Filed: Aug. 23, 1990

[51] Int. Cl.$^5$ .............................................. C08F 4/656
[52] U.S. Cl. .................... 502/124; 502/121; 502/123; 502/125; 502/127; 526/125
[58] Field of Search .............. 502/121, 123, 124, 125, 502/127

[56] References Cited

U.S. PATENT DOCUMENTS

| 4,180,636 | 12/1979 | Hirota et al. | 502/105 X |
|---|---|---|---|
| 4,242,479 | 12/1980 | Yokota et al. | 502/125 X |
| 4,347,160 | 8/1982 | Epstein et al. | 252/429 B |
| 4,382,019 | 5/1983 | Grece | 252/429 B |
| 4,435,550 | 3/1984 | Uemo et al. | 526/73 |
| 4,442,276 | 4/1984 | Kashiwa et al. | 502/125 X |
| 4,465,782 | 8/1984 | McKenzie et al. | 526/125 X |
| 4,472,524 | 9/1984 | Albizzati | 526/125 X |
| 4,473,660 | 9/1984 | Albizzati et al. | 526/125 X |
| 4,522,930 | 6/1985 | Albizzati et al. | 526/125 X |
| 4,530,912 | 7/1985 | Pullukat et al. | 526/128 X |
| 4,560,671 | 12/1985 | Gross et al. | 526/159 X |
| 4,581,342 | 4/1986 | Johnson et al. | 502/156 X |
| 4,657,882 | 4/1987 | Karayammis et al. | 526/125 X |

FOREIGN PATENT DOCUMENTS 0045976 8/1981 Italy .
0045977 8/1981 Italy .

Primary Examiner—Patrick P. Garvin

[57] ABSTRACT

Disclosed are catalysts for the polymerization of alpha-olefins comprising the reaction product of:
(A) an Al-alkyl compound;
(B) a trifluoropropyl substituted silane compound;
(C) a solid component comprising a titanium compound having at least a Ti-halogen bond and an electron donor compound both supported on an activated anhydrous magnesium dihalide, and the process of using said catalysts.

12 Claims, No Drawings

CATALYST FOR THE POLYMERIZATION OF ALPHA-OLEFINS CONTAINING TRIFLUOROPROPYL SUBSTITUTED SILANE COMPOUNDS

FIELD OF INVENTION

This invention relates to catalysts for polymerizing alpha-olefins, which are particularly suited for the production of alpha-olefin polymers, having high catalytic activity. More specifically, this invention relates to catalysts for polymerizing alpha-olefins comprising a trifluoropropyl substituted silane compound as a co-catalyst component.

BACKGROUND OF THE INVENTION

Organosilane compounds have been used in catalyst systems 1) as an electron donor in the solid catalyst component comprising a halogen-containing Ti compound supported on an anhydrous activated Mg-dihalide compound and (2) as an electron donor with the co-catalyst component comprising an organometallic compound. Typically they are organosilane compounds having Si—OR, Si—OCOR or Si—NR$_2$ bonds, where R is alkyl, alkenyl, aryl, arylalkyl or cycloalkyl having 1 to 20 carbon atoms and Si as the central atom. Such compounds are described in U.S. Pat. Nos. 4,180,636, 4,242,479, 4,347,160, 4,382,019, 4,435,550, 4,442,276, 4,465,782, 4,473,660, 4,530,912 and 4,560,671 where they are used as electron donors in the solid catalyst component; and in U.S. Pat. Nos. 4,472,524, 4,522,930, 4,560,671, 4,581,342, 4,657,882 and European patent applications 45976 and 45977 where they are used as electron donors with the co-catalyst.

In particular, U.S. Pat. Nos. 4,180,636, 4,242,479 and 4,442,276 disclose organosilane compounds of the formula R$_a$Si(OR')$_b$, where R and R' are the same or different and represent a hydrocarbon radical having at most 20 carbon atoms, derivatives thereof substituted with at most 3 halogen atoms, a +b is 4, with the proviso that a is not 0 and where R is also hydrogen or a halogen, in a solid catalyst component in addition to conventional components, such as Ti, Mg, halogen and, optionally an electron donor.

However, in all of the above catalyst systems in which an organosilane compound is used, none describe the use of trifluoropropyl containing organosilane compounds as a co-catalyst component with organoaluminum compounds in Ziegler-Natta supported catalyst systems for the polymerization of alpha-olefins.

SUMMARY OF THE INVENTION

The present invention provides a catalyst for polymerizing alpha-olefins having high catalytic activity, comprising the reaction product of:

(A) an Al-alkyl compound;

(B) a trifluoropropyl substituted silane compound of the formula:

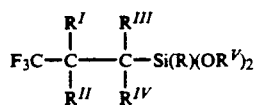

where $R^I$, $R^{II}$ are the same or different and are hydrogen, linear C$_{1-3}$ alkyl, C$_{5-6}$ cycloalkyl, or phenyl, optionally substituted in the para position with a halogen, linear or branched C$_{1-8}$ alkyl or C$_{1-8}$ alkoxy; $R^{III}$ and $R^{IV}$ are the same or different and are hydrogen or linear C$_{1-3}$ alkyl, provided that when $R^I$ or $R^{II}$ are other than hydrogen, $R^{III}$ and $R^{IV}$ must be hydrogen and when $R^{III}$ or $R^{IV}$ are alkyl, $R^I$ and $R^{II}$ must be hydrogen; R is linear or branched C$_{1-6}$ alkyl; C$_{5-12}$ cycloalkyl; pyrrolidinyl; piperidinyl, optionally substituted with linear or branched C$_{1-4}$ alkyl; —OR$^V$, where R$^V$ is as defined below; or

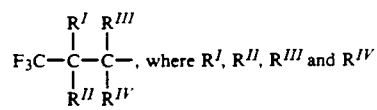

are defined as above; and R$^V$ is methyl or ethyl; and (C) a solid component comprising a titanium compound having at least a Ti-halogen bond and an electron donor compound both supported on an activated anhydrous magnesium dihalide.

Another embodiment of the present invention is the use of the above described catalyst in the polymerization of alpha-olefins to produce olefin polymers having low molecular weight in high mileage.

BRIEF DESCRIPTION OF THE INVENTION

The Al-alkyl compounds forming component (A), which are non-halogen containing, include Al-trialkyl, such as Al-triethyl, Al-triisopropyl, Al-triisobutyl, Al-dialkyl hydrides, such as Al-diethyl hydride, and compounds containing two or more Al atoms linked to each other through oxygen, nitrogen or sulfur hetero-atoms, such as:

$$(C_2H_5)_2Al—O—Al(C_2H_5)_2;$$

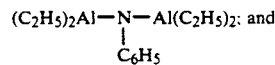

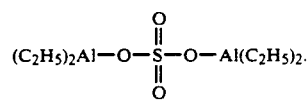

Preferably, the Al-alkyl compound is Al-triethyl.

Examples of the trifluoropropyl substituted silane compound of component (B) having the above formula include 3,3,3-trifluoropropyl(methyl)dimethoxy silane, 3,3,3-trifluoropropyl(ethyl)dimethoxy silane, 3,3,3-trifluoropropyl(isobutyl)dimethoxy silane, 3,3,3-trifluoropropyl(tert-butyl)dimethoxy silane, 3,3,3-trifluoropropyl(cyclopentyl)dimethoxy silane, 3,3,3-trifluoropropyl(cyclohexyl)dimethoxy silane, 3,3,3-trifluoropropyl(pyrrolidyl)dimethoxy silane, 3,3,3-trifluoropropyl(4-methylpiperidyl)dimethoxy silane, 3,3,3-trifluoropropyltriethoxy silane, 1-methyl-3,3,3-trifluoropropyl(methyl)dimethoxy silane, 1,1-dimethyl-3,3,3-trifluoropropyl(methyl)dimethoxy silane; 2-methyl-3,3,3-trifluoropropyl(cyclohexyl)dimethoxy silane, 2,2-dimethyl-3,3,3-trifluoropropyl(t-butyl)dimethoxy silane, bis-(3,3,3-trifluoropropyl)dimethoxy silane, 2-phenyl-3,3,3-trifluoropropyl(cyclopentyl)dimethoxy silane, bis-(1-methyl-3,3,3-trifluoropropyl)dimethoxy silane.

The trifluoropropyl substituted silane compounds of component (B) can be prepared by using, optionally substituted, 3,3,3-trifluoropropyltrialkoxysilane or 3,3,3-trifluoropropyltrichlorosilane as the starting material and reacting it with 1) LiR, where R is defined as above, or 2) RMgX, where R is as defined above, other than pyrrolidinyl or piperidinyl, and X is halogen.

In the solid component (C), suitable examples of the titanium compound having at least a Ti-halogen bond are Ti tetrahalides, in particular, TiCl$_4$. However, alkoxy halides can also be used.

The electron donor compounds employed in component (C) include alkyl, aryl and cycloalkyl esters of aromatic acids, especially benzoic acid or phthalic acid and their derivatives. Specific examples include ethyl benzoate, n-butyl benzoate, methyl p-toluate, methyl p-methoxybenzoate and diisobutylphthalate. In addition to the above esters, alkyl or alkaryl ethers, ketones, mono- or polyamines, aldehydes and phosphorous compounds, such as phosphines and phosphoramides can also be used as the electron donor.

The active anhydrous magnesium dihalides forming the support of component (C) are the Mg dihalides showing in the X-ray powder spectrum of component (C) a broadening of at least 30% of the most intense diffraction line which appears in the powder spectrum of the corresponding dihalide having 1 m$^2$/g of surface area or are the Mg dihalides showing an X-ray powder spectrum in which said most intense diffraction line is replaced by a halo with an intensity peak shifted with respect to the interplanar distance of the most intense line and/or are the Mg dihalides having a surface area greater than 3 m$^2$/g The measurement of the surface area of the Mg dihalides is made on component (C) after treatment with boiling TiCl$_4$ for 2 hours. The value found is considered as surface area of the Mg dihalide.

The Mg dihalide may be preactivated, may be activated in situ during the titanation, may be formed in situ from a Mg compound, which is capable of forming Mg dihalide when treated with a suitable halogen-containing transition metal compound, and then activated, or may be formed from a Mg dihalide C$_{1-8}$ alkanol adduct wherein the molar ratio of MgCl$_2$ to alcohol is 1:1 to 1:3, such a MgCl$_2$·3ROH.

Very active forms of Mg dihalides are those showing an X-ray powder spectrum in which the most intense diffraction line appearing in the spectrum of the corresponding halide having 1 m$^2$/g of surface area is decreased in relative intensity and broadened to form a halo or are those in which said most intense line is replaced by a halo having its intensity peak shifted with respect to the interplanar distance of the most intense line. Generally, the surface area of the above forms is higher than 30–40 m$^2$/g and is comprised, in particular, between 100–300 m$^2$/g.

Active forms are also those derived from the above forms by heat-treatment of component (C) in inert hydrocarbon solvents and showing in the X-ray spectrum sharp diffraction lines in place of halos. The sharp, most intense line of these forms shows, in any case, a broadening of at least 30% with respect to the corresponding line of Mg dihalides having 1 m$^2$/g of surface area.

Preferred Mg dihalides are MgCl$_2$ and MgBr$_2$ and the most preferred is MgCl$_2$. The content in water of the halides is generally less than 1% by weight.

By Ti halides or Ti alkoxy halides and electron donors supported on active Mg dihalide is meant the above compounds which may be chemically or physically fixed on the support and not extractable from component (C) by treatment of the same with boiling 1,2-dichloroethane for 2 hours.

Component (C) can be made by various methods. One method consists of co-grinding the Mg dihalide and the electron donor compound until the product, after extraction with Al-triethyl under standard conditions, shows a surface area higher than 20 m$^2$/g, as set forth above for the spectrum of the Mg dihalide, and thereafter reacting the ground product with the Ti compound.

Other methods of preparing the solid catalyst component (C) are disclosed in U.S. Pat. No. 4,220,554, 4,294,721, 4,315,835 and 4,439,540, the methods of which are incorporated herein by reference.

In all of the above methods, component (C) contains a Mg dihalide present in the active form as set forth above.

Other known methods which lead to the formation of Mg dihalide in active form or to Ti-containing Mg dihalide supported components, in which the dihalide is present in active form, are based on the following reactions:

(i) reaction of a Grignard reagent or of a MgR$_2$ compound (R being a hydrocarbyl radical) or of complexes of said MgR$_2$ compounds with Al trialkyl, with halogenating agents as AlX$_3$ or AlR$_m$X$_n$ compounds (X is halogen, R is a hydrocarbyl, m+n=3), SiCl$_4$ or HSiCl$_3$;

(ii) reaction of a Grignard compound with a silanol or polysiloxane, H$_2$O or with an alcohol and further reaction with a halogenating agent or with TiCl$_4$;

(iii) reaction of Mg with an alcohol and a halogen halide acid, or of Mg with a hydrocarbyl halide and an alcohol;

(iv) reaction of MgO with Cl$_2$ or AlCl$_3$;

(v) reaction of MgX$_2$·nH$_2$O (X=halogen and n is 1-3) with a halogenating agent or TiCl$_4$; or (vi) reaction of Mg mono or dialkoxides or Mg carboxylates with a halogenating agent.

In component (C), the molar ratio between the Mg dihalides and the halogenated Ti compound supported thereon is between 1 and 500 and the molar ratio between said halogenated Ti compound and the electron donor supported on the Mg dihalide is between 0.1 and 50.

The catalyst, i.e., components (A), (B) and (C) can be added to the polymerization reactor by separate means substantially simultaneously, regardless of whether the monomer is already in the reactor, or sequentially if the monomer is added to the polymerization reactor later. It is preferred to premix components (A) and (B), then contact said premix with component (C) prior to the polymerization for from 3 minutes to about 10 minutes at ambient temperature.

The olefin monomer can be added prior to, with or after the addition of the catalyst to the polymerization reactor. It is preferred to add it after the addition of the catalyst.

Hydrogen can be added as needed as a chain transfer agent for reduction in the molecular weight of the polymer.

The polymerization reactions can be done in slurry, liquid or gas phase processes, or in a combination of liquid and gas phase processes using separate reactors, all of which can be done either by batch or continuously.

The polymerization is generally carried out at a temperature of from 40°–90° C. and at atmospheric pressure or at higher pressure.

The catalysts may be precontacted with small quantities of olefin monomer (prepolymerization), maintaining the catalyst in suspension in a hydrocarbon solvent and polymerizing at a temperature of 60° C. or below for a time sufficient to produce a quantity of polymer from 0.5 to 3 times the weight of the catalyst.

This prepolymerization also can be done in liquid or gaseous monomer to produce, in this case, a quantity of polymer up to 1000 times the catalyst weight.

Suitable alpha-olefins which can be polymerized by this invention include olefins of the formula $CH_2=CHR$, where R is H or $C_{1-10}$ straight or branched alkyl, such as ethylene, propylene, butene-1, pentene-1, 4-methylpentene-1 and octene-1.

The following examples are shown to illustrate the invention and are not intended to define the scope thereof.

All solvents were freshly dried and distilled and stored over activated molecular sieves under an inert atmosphere, prior to use.

The silane compounds were analyzed by gas chromatography-mass spectrometry (GC-MS) using a Hewlett-Packard Model 5890 Gas Chromatograph linked with a model 5970 Mass Selective Detector and a Series 300 Chemstation for integration and data handling. The column was a H-P 1 Ultra fused silica capillary column, 30 m×0.2 mm with a 0.18 micron film thickness. The chromatographic conditions were as follows: GC injector temperature of 200° C.; transfer line temperature of 250° C.; GC oven program set at 75° C. to 250° C. at 6 deg. per minute, held at 250° C. for 15 minutes; carrier gas (helium) flow rate of 0.6 ml/min., a split flow rate of 40 ml/min.; and an injection volume of 0.1 microliter. The scan range for the MS was 10 to 600 amu. The mass spectra were obtained from the Total Ion Chromatogram after the GC had been completed.

Preparation of the Organosilane Compounds

Component B-1

3,3,3-trifluoropropyl(isobutyl)dimethoxy silane

Under nitrogen, a 500 ml Schlenk flask was cooled to room temperature and charged with 150 ml of diethyl ether and isobutylmagnesium chloride (0.06 mol, 30.24 ml). This was stirred and heated slightly to 30° C. A second Schlenk flask (100 ml) was purged with nitrogen to room temperature and charged with 75 ml hexane and 3,3,3-trifluoropropyltrimethoxy silane (0.0504 mol, 10 ml) and stirred. The silane/hexane solution was added dropwise via cannula to the Grignard/diethyl ether mixture producing a white precipitate midway through the addition. After addition (1.25 hrs.), the reaction mixture was stirred at room temperature for one hour. The flask was fitted with a reflux condenser and the reaction mixture was refluxed for two hours, then allowed to cool to room temperature. The reaction mixture was filtered through a medium porosity frit, using Celite diatomaceous earth and glass wool as a filtering aid. The solids collected weighed 7.55 g (theoretical=4.56 grams of magnesium salts). The slightly cloudy filtrate was kept under nitrogen overnight.

The solvents were removed in vacuo leaving 21.33 g of a colorless, cloudy liquid (crude product). The crude oil was distilled under vacuum (0.035 mm Hg), and a clear oil was collected (23° C.). The yield was 10.18g (83%). The GC analysis indicated the product to be 98.9% pure; confirmed by GC-MS; calculated for $C_9H_{19}O_2F_3Si$, 244.31 amu; m/z=244 amu.

Component B-2

3,3,3-trifluoropropyl(cyclopentyl)dimethoxysilane

Under nitrogen, a 500 ml Schlenk flask was cooled to room temperature, charged with 150 ml of diethyl ether and cyclopentylmagnesium chloride (0.055 mol, 27.7 ml) and warmed slightly to 30° C. A 100 ml Schlenk flask was purged with nitrogen and charged with 75 ml hexane and 3,3,3-trifluoropropyltrimethoxy silane (10 ml, 0.0504 mol). The silane/hexane solution was added dropwise via cannula to the Grignard/diethyl ether mixture producing a white cloudy mixture. After addition (1.25 hrs.), the Grignard containing flask was rinsed once with 25 ml of hexane. The reaction mixture was stirred at room temperature for one hour.

A nitrogen purged reflux condenser was fitted to the 500 ml Schlenk flask and the reaction mixture was refluxed for two hours. The magnesium salts were allowed to settle at room temperature and the reaction mixture stored in the freezer overnight.

The reaction mixture was filtered under vacuum through a medium porosity frit, using Celite diatomaceous earth and glass wool as a filtering aid. A colorless, cloudy solution resulted, and the solvents were removed in vacuo leaving 18.76 grams of a cloudy oil (crude product). The crude oil was distilled under vacuum (0.05 mm Hg); a clear oil collected at 31° C. (9.22 g, 71.2% yield). The GC analysis indicated the product to be 98.27% pure; confirmed by GC-MS analysis, calculated for $C_{10}H_{19}O_2F_3Si$, 256.32 amu; m/z=255 amu.

Component B-3

3,3,3-trifluoropropyl(tert-butyl)dimethoxy silane

Under nitrogen, a 500 ml Schlenk flask was cooled to 0° C. and charged with 150 ml hexane and 3,3,3-trifluoropropyl trimethoxy silane (0.075 mol, 15 ml). A nitrogen purged addition funnel was fitted to the flask and charged with tert-butyllithium (0.075 mol, 34 ml). This was added dropwise to the cooled flask creating a cloudy, white precipitate ($LiOCH_3$). After addition (1 hour), the addition funnel was washed with 20 ml of hexane. The ice bath was removed and the reaction mixture was allowed to warm to room temperature. The flask was fitted with a reflux condenser and the reaction mixture refluxed for two hours. After cooling to room temperature, the reaction mixture was filtered through a medium porosity filter tube, using Celite diatomaceous earth and glass wool as a filtering aid. A white solid was collected, which weighed 11.13 g wet (theoretical=3.0 grams of $LiOCH_3$). The hexane was removed from the filtrate to give 20.33 g of a clear yellow oil.

The crude product was distilled under vacuum (0.1 mm Hg). A clear oil was collected at room temperature (25° C.; 9.70 g; 53% yield). The GC analysis indicated the product to be 93% pure, redistillation under vacuum yielded 5.5 grams of a clear oil. GC analysis indicated the product to be 97.6% pure.

Component B-4

3,3,3-trifluoropropyl(pyrrolidyl)dimethoxy silane

Under nitrogen, a 500 ml Schlenk flask was cooled to 0° C. in an ice bath and charged with 125 ml hexane and pyrrolidine (0.0504 mol, 4.2 ml) and the solution stirred. The flask was fitted with a nitrogen purged addition funnel (50 ml) which had been charged with n-butyllithium (0.0505 mol, 20.16 ml). The n-butyllithium was added dropwise to the Schlenk flask, producing a milky, white mixture. After addition (0.75 hrs.), two additional washings of hexane (20 ml total) were used to rinse the addition funnel. The ice bath was removed and the reaction mixture was stirred at room temperature for an additional hour.

A second 500 ml Schlenk flask was purged with nitrogen and charged with 50 ml hexane and 3,3,3-trifluoropropyltrimethoxy silane (0.0504 mol, 10 ml) then cooled to 0° C. The lithium/amide mixture was added dropwise over a period of 2 hours to the cooled silane solution. Then several washings of hexane were used to insure transfer of all of the lithium/amide mixture. The ice bath was removed and the solution warmed to room temperature. The reaction vessel was fitted with a reflux condenser and the reaction mixture refluxed for two hours. The mixture was stirred overnight under nitrogen at room temperature.

The reaction mixture was filtered under vacuum through a medium porosity frit, using Celite diatomaceous earth and glass wool as a filtering aid. A white solid collected in the filter tube weighing 3.8 g (LiOCH$_3$, theoretical=1.9 g). The hexane was removed from the filtrate in vacuo leaving 24.66 g of a clear oil (crude product). The crude oil was distilled under vacuum (0.035 mm Hg); a clear oil collected at 30° C. (10.1 g, 78% yield). GC analysis indicated the product to be 95.6% pure.

Polymerization of Propylene

EXAMPLE 1

The polymerization reactor was heated to 70° C. and purged with a slow argon flow for 1 hour. The reactor was then pressured up to 100 psig with argon at 70° C. then vented; and this procedure was repeated 4 more times. The reactor was then pressured up to 100 psig with propylene then vented; and this procedure was also repeated 4 more times. The reactor was then cooled to 30° C.

Separately, into an argon purged addition funnel was introduced in the following order: 75 ml of hexane, 6.7 ml of 1.0M solution of triethylaluminum (TEAL) (6.7 mmol) in hexane, 3.4 ml of a 0.1M solution of 3,3,3-trifluoropropyl(methyl)dimethoxy silane (0.34 mmol) (commercially available from Shin-Etsu Chemical Company) in hexane and allowed to stand for 5 minutes. Of this mixture, 35 ml was added to a flask. Then 0.0099 g of FT4S solid catalyst component (commercially available from HIMONT Italia S.r.l.) was added to the flask and mixed by swirling for a period of 5 minutes. The catalytic complex so obtained was introduced, under a propylene purge, into the above polymerization reactor at room temperature. The remaining hexane/TEAL/silane solution was then drained from the addition funnel into the flask, the flask was swirled and the contents drained into the reactor.

The polymerization reactor was slowly charged with 2.2 liters of liquid propylene, while agitating, and 0.30 mole percent of H$_2$. Then the reactor was heated to 70° C. and maintained for about 2 hours at constant temperature and pressure. After about 2 hours agitation was stopped and the remaining propylene was slowly vented. The reactor was heated to 80° C., purged with argon for 10 minutes and then cooled to room temperature and opened. The polymer was removed and dried in a vacuum oven at 80° C. for 1 hour. The polymerization results are set forth in Table 1.

EXAMPLE 2

The procedure of Example 1 was followed except that 3,3,3-trifluoropropyl(ethyl)dimethoxysilane (commercially available from Shin-Etsu Chemical Company) was used instead of 3,3,3-trifluoropropyl(methyl)dimethoxy silane. The results are set forth in Table 1.

COMPARATIVE EXAMPLE 1

The same polymerization procedure as in Example 1 was carried out except that phenyltriethoxysilane (PES commercially available from Huls America, Inc., Petrarch Systems Silanes) was used instead of a trifluoropropyl(alkyl)dialkoxy silane compound of the invention. The results of this polymerization are set forth in Table 1.

Unless otherwise specified, the intrinsic viscosity of the polymers, IV, is measured in decalin at 135° C. using a Ubbelohde type viscometer tube by the method of J. H. Elliot et al., J. Applied Polymer Sci., 14, 2947-63 (1970). The mileage of the polymer is calculated according to the formula:

$$\text{mileage} = \frac{\text{grams of polypropylene}}{\text{grams of catalyst}}$$

The percent xylene solubles at room temperature, % XSRT, of the polymer was determined by dissolving 2 g of polymer in 200 ml of xylene at 135° C., cooling in a constant temperature bath at 22° C. and filtering through fast filter paper. An aliquot of the filtrate was evaporated to dryness, the residue weighed and the weight % soluble fraction calculated.

TABLE 1

|  | Al/Si | Mileage g of PP/g of Catalyst | IV | % XSRT |
|---|---|---|---|---|
| Example 1 | 10/1 | 49,300 | 1.78 | 2.86 |
|  | 20/1 | 51,500 | 1.80 | 3.47 |
|  | 40/1 | 55,400 | 1.75 | 3.85 |
| Example 2 | 10/1 | 49,300 | 2.03 | 1.99 |
|  | 20/1 | 51,800 | 2.16 | 2.11 |
|  | 40/1 | 59,200 | 1.87 | 2.60 |
| Comp. Ex. 1 | 10/1 | 28,500 | 1.85 | 2.19 |
|  | 20/1 | 31,700 | 1.85 | 1.73 |
|  | 40/1 | 32,200 | 1.75 | 4.08 |

It can be seen from Example 1 and 2 that the use of the trifluoropropyl(alkyl)dialkoxy silane compound of the present invention leads to higher mileages than PES of the Comparative Example 1.

EXAMPLES 3 TO 6

The polymerization procedure of Example 1 was followed except that 0.25% H$_2$ was used instead of 0.30 % H$_2$ and a 20/1 ratio of Al/Si and 3,3,3-trifluoropropyl substituted silane compounds of the present invention set forth in Table 2 were used.

The results are also set forth in Table 2.

TABLE 2

| Ex. | Organosilane Compound | Mileage g of PP/g of Cat. | IV | % XSRT |
|---|---|---|---|---|
| 3 | 3,3,3-trifluoropropyl-(isobutyl)dimethoxy-silane | 52,200 | 2.78 | 1.83 |
| 4 | 3,3,3-trifluoropropyl-(t-butyl)dimethoxysilane | 52,600 | 2.64 | 1.26 |
| 5 | 3,3,3-trifluoropropyl- | 50,300 | 2.36 | 1.98 |

TABLE 2-continued

| Ex. | Organosilane Compound | Mileage g of PP/g of Cat. | IV | % XSRT |
|---|---|---|---|---|
| | (cyclohexyl)dimethoxysilane | | | |
| 6 | 3,3,3-trifluoro-propyl-(4-methylpiperidyl)dimethoxysilane | 43,900 | 2.35 | 1.51 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. Catalysts for the polymerization of alpha-olefins comprising the reaction product of:

(A) a non-halogen containing Al-alkyl compound
    (B) a trifluoropropyl substituted silane compound of the formula:

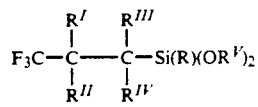

where $R^I$, $R^{II}$ are the same or different and are hydrogen, linear $C_{1-3}$ alkyl, $C_{5-6}$ cycloalkyl, or phenyl, optionally substituted in the para position with a halogen, linear or branched $C_{1-8}$ alkyl or $C_{1-8}$ alkoxy; $R^{III}$ and $R^{IV}$ are the same or different and are hydrogen or linear $C_{1-3}$ alkyl, provided that when $R^I$ or $R^{II}$ is other than hydrogen, $R^{III}$ and $R^{IV}$ must be hydrogen and when $R^{III}$ or $R^{IV}$ is alkyl, $R^I$ and $R^{II}$ must be hydrogen; R is linear or branched $C_{1-6}$ alkyl, $C_{5-12}$ cycloalkyl, pyrrolidinyl, unsubstituted or $C_{1-4}$ linear or branched alkyl substituted piperidinyl, $-OR^V$, where $R^V$ is as defined below, or

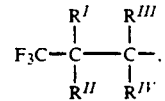

where $R^I$, $R^{II}$, $R^{III}$ and $R^{IV}$ are defined as above; and $R^V$ is methyl or ethyl; and (C) a solid component comprising a titanium compound having at least a Ti-halogen bond and an electron donor compound both supported on an activated anhydrous Mg-dihalide.

2. The catalyst according to claim 1, wherein R is methyl in (B).

3. The catalyst according to claim 2, wherein $R^I$, $R^{II}$, $R^{III}$ and $R^{IV}$ are hydrogen in (B).

4. The catalyst according to claim 2, wherein $R^I$ and $R^{II}$ are hydrogen and $R^{III}$ and are $C_{1-3}$ alkyl in (B).

5. The catalyst according to claim 1, wherein R is t-butyl in (B).

6. The catalyst according to claim 5, wherein R is alkoxy in (B).

7. The catalyst according to claim 5, wherein $R^I$ and $R^{II}$ are hydrogen and $R^{III}$ and $R^{VI}$ are $C_{1-3}$ alkyl in (B).

8. The catalyst according to claim 1, wherein R is cyclohexyl in (B).

9. The catalyst according to claim 8, wherein $R^I$ and $R^{II}$ are hydrogen and $R^{III}$ and $R^{IV}$ are $C_{1-3}$ alkyl in (B).

10. The catalyst according to claim 1, wherein R is trifluoropropyl in (B).

11. The catalyst according to claim 10, wherein $R^I$, $R^{II}$ are hydrogen, and $R^{III}$ and $R^{IV}$ are $C_{1-3}$ alkyl in (B).

12. The catalyst according to claim 10, wherein $R^I$, $R^{II}$, $R^{III}$ and $R^{IV}$ are hydrogen.

* * * * *

UNITED STATES PATENT AND TRADEMARK OFFICE
CERTIFICATE OF CORRECTION

PATENT NO. : 5,102,842

DATED : April 7, 1992

INVENTOR(S) : Smith et al

It is certified that error appears in the above-identified patent and that said Letters Patent is hereby corrected as shown below:

Col. 10, line 22, after "$R^{III}$ and" insert --$R^{IV}$--.

Col. 10, line 28, change "$R^{VI}$" to --$R^{IV}$--.

Signed and Sealed this

Second Day of November, 1993

Attest:

BRUCE LEHMAN

*Attesting Officer*     Commissioner of Patents and Trademarks